United States Patent [19]

Armand et al.

[11] Patent Number: 5,449,994

[45] Date of Patent: Sep. 12, 1995

[54] SUPPLY COMPONENT OF THE CREDIT CARD TYPE

[75] Inventors: Michel Armand, St. Martin d'Uriage; Louis Balme, Ferney Voltaire; Carole Silvy, Grenoble, all of France

[73] Assignees: Institut National Polytechnique de Grenoble, Grenoble, France; Acep Inc., Montreal, Canada

[21] Appl. No.: 937,900

[22] PCT Filed: Feb. 12, 1992

[86] PCT No.: PCT/FR92/00124

§ 371 Date: Oct. 8, 1992

§ 102(e) Date: Oct. 8, 1992

[87] PCT Pub. No.: WO92/15140

PCT Pub. Date: Sep. 3, 1992

[30] Foreign Application Priority Data

Feb. 13, 1991 [FR] France .................. 91 01976

[51] Int. Cl.$^6$ .................................................. H02J 7/04
[52] U.S. Cl. ................................. 320/14; 320/44; 324/427
[58] Field of Search ............. 320/43, 44, 48, 2, 14; 324/426, 427

[56] References Cited

U.S. PATENT DOCUMENTS

| 4,803,416 | 2/1989 | Abiven et al. | 320/44 |
| 4,947,123 | 8/1990 | Minezawa | 324/427 |

FOREIGN PATENT DOCUMENTS

| 0108492 | 5/1984 | European Pat. Off. |
| 61-294754 | 12/1986 | Japan. |
| 63-276836 | 3/1989 | Japan. |
| 2116728 | 9/1983 | United Kingdom. |

OTHER PUBLICATIONS

Munishi et al., "Flat Polymer Electrolytes Promise Thin–Film Power", Aug. 1989, pp. 32–35.

*Primary Examiner*—Kristine L. Kincaid
*Attorney, Agent, or Firm*—Lowe, Price, LeBlanc & Becker

[57] ABSTRACT

The present invention relates to a portable autonomous electronic component of the credit card format comprising an accumulator (1) constituted of an association of sheets or planar layers, the surface of which is approximately equal to that of the credit card, at least a charging circuit (2,4), and state indicators (6) controlled by a micro-controller (5).

4 Claims, 3 Drawing Sheets

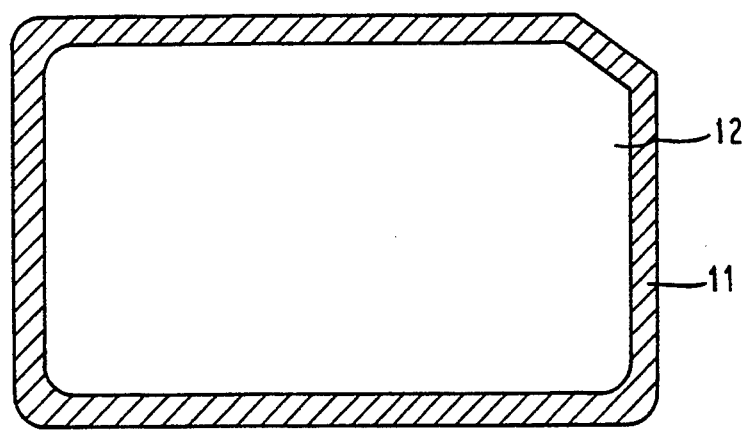
Figure 2.1
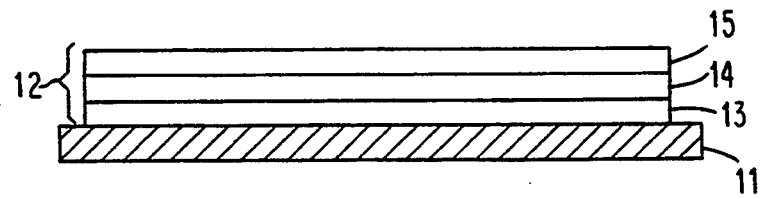
Figure 2.2

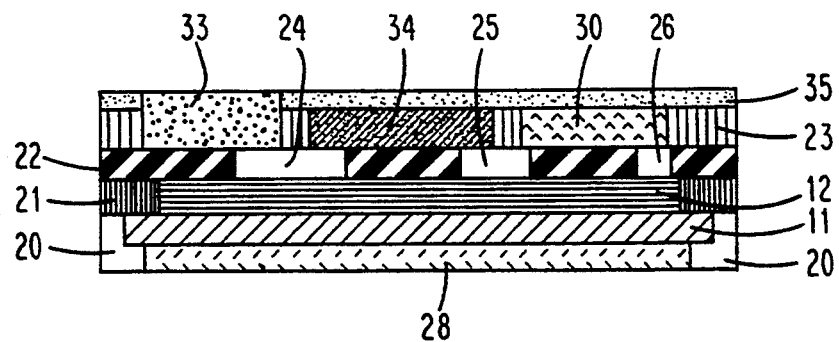
Figure 3
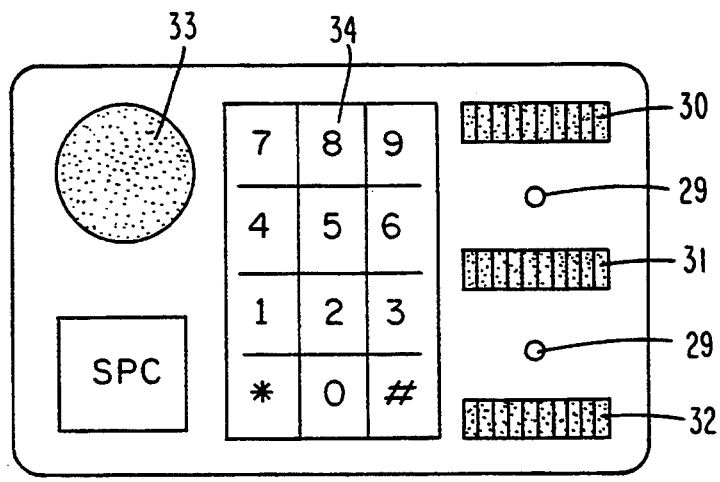
Figure 4.1
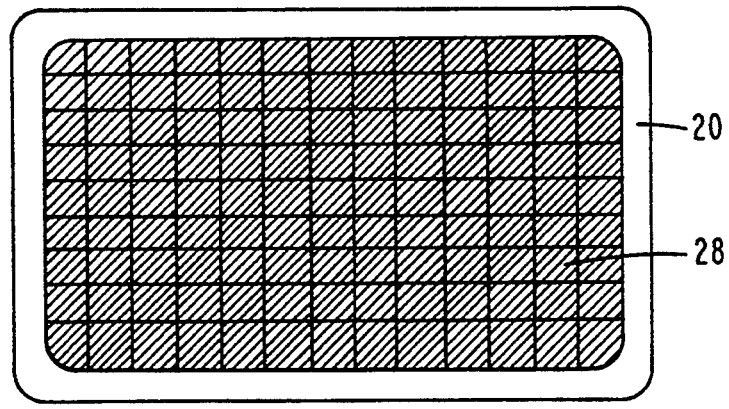
Figure 4.2

SUPPLY COMPONENT OF THE CREDIT CARD TYPE

BACKGROUND OF THE INVENTION

1. Field of Invention

The invention relates to electrical energy storing devices and more specifically to energy storing for systems comprising microelectronic integrated circuits with memory.

2. Description of Related Art

Presently, there are three main types of electric supply sources for microelectronic circuits (a chip or a complex electronic system having a determined function):

1) the 110 or 220 V mains from which, after voltage lowering by a transformer, rectifying, filtering and controlling or use of switching devices, a D.C. voltage (usually from 5 to 15 volts) is provided to the microelectronic circuit;

2) the battery which is a self-contained supply source for an electronic device;

3) the rechargeable battery or accumulator, which was usually a lead accumulator and which is presently, generally, in the field of electronic circuit feeding, a cadmium-nickel accumulator.

The mains presents of course the advantage of being a large energy source (in as much as the A.C. mains at 110 or 220 V is reliable) but has however major drawbacks, that is, being cumbersome, weighty, noisy, subject to parasites, and not portable.

The non-rechargeable battery has the drawback of a limited lifetime, a rather poor reliability in an hostile environment, and a high cost.

Therefore, the present trend is to use rechargeable accumulators. Self-contained like a battery, an accumulator solves the problem of the lifetime due to the possibility of recharging, the number of recharges varying according to the electrochemical nature of the accumulator. The problem of reliability is however not solved. Additionally, recharging circuits for rechargeable accumulators ape generally relatively complex and generate an electromagnetic noise. Additionally, if they are disposed inside the system to be supplied, they are cumbersome and take an important surface on a printed circuit board provided in the system.

INVENTION SUMMARY

An object of the invention is to provide for an accumulator system with all its recharge and test elements having the form of a self-contained portable component.

A more specific object of the invention is to implement such a self-contained component having the usual credit card format (thin rectangular card of about 85×54 cm).

For attaining those objects, the; invention provides for a self-contained portable electronic component having a credit card format comprising at least an accumulator made of a pile of sheets or planar layers, the surface of which is substantially equal to the surface of the credit card, at least a charging circuit and state indicators controlled by a microcontroller associated with means for measuring at short and regularly spaced time intervals the current in the accumulator and means for calculating, storing, and summing the charge variations.

According to an embodiment of the invention, the state indicators comprise an indicator of the residual number of possible recharges associated with the means for summing the charge variations during the discharge phases.

According to an embodiment of the invention, the state indicators comprise a charge ratio indicator associated with the means for summing the charge variations during the charge and discharge phases.

According to an embodiment of the invention, the state indicators comprise an instantaneous consumption indicator associated with means for measuring the voltage variation at regularly spaced time intervals.

Preferentially, the accumulator is an accumulator with a polymer solid state electrolyte made of thin layers having a thickness of 1 to 500 micrometers and having autodischarge characteristics lower than 5% of its nominal capacity per year.

According to an embodiment of the invention, one of the external surfaces of the component comprises a solar cell array. This external face, or the other one, comprises an electrode area for charging, and using and exchanging data with external devices, this electrode area having the standard format of credit card electrodes.

According to an embodiment of the invention, this component comprises, above the sheet pile constituting the a accumulator, at least one printed circuit board. At least one of those boards is provided with openings, wherein are disposed at least some of the electronic circuit elements necessary to the operation of the component. The upper board comprises apertures wherein are disposed the state indicators.

According to an embodiment of the invention, this component comprises an encoding keyboard.

Those objects, features and advantages and others of the invention will be explained in greater detail in the following description of preferred embodiments, in relation with the attached drawings wherein:

BRIEF DESCRIPTION OF DRAWINGS

FIG. 2.1 is a schematic front view of an accumulator cell according to the invention and FIG. 2.2 is a section view of the cell;

FIG. 3 is a schematic cross section of an arrangement of elements constituting an embodiment of the invention; and FIG. 4.1 is a schematic front view of the structure of FIG. 3; and FIG. 4.2 is a view of the other face of the structure of FIG. 3.

DESCRIPTION OF PREFERRED EMBODIMENT

Figure 1:
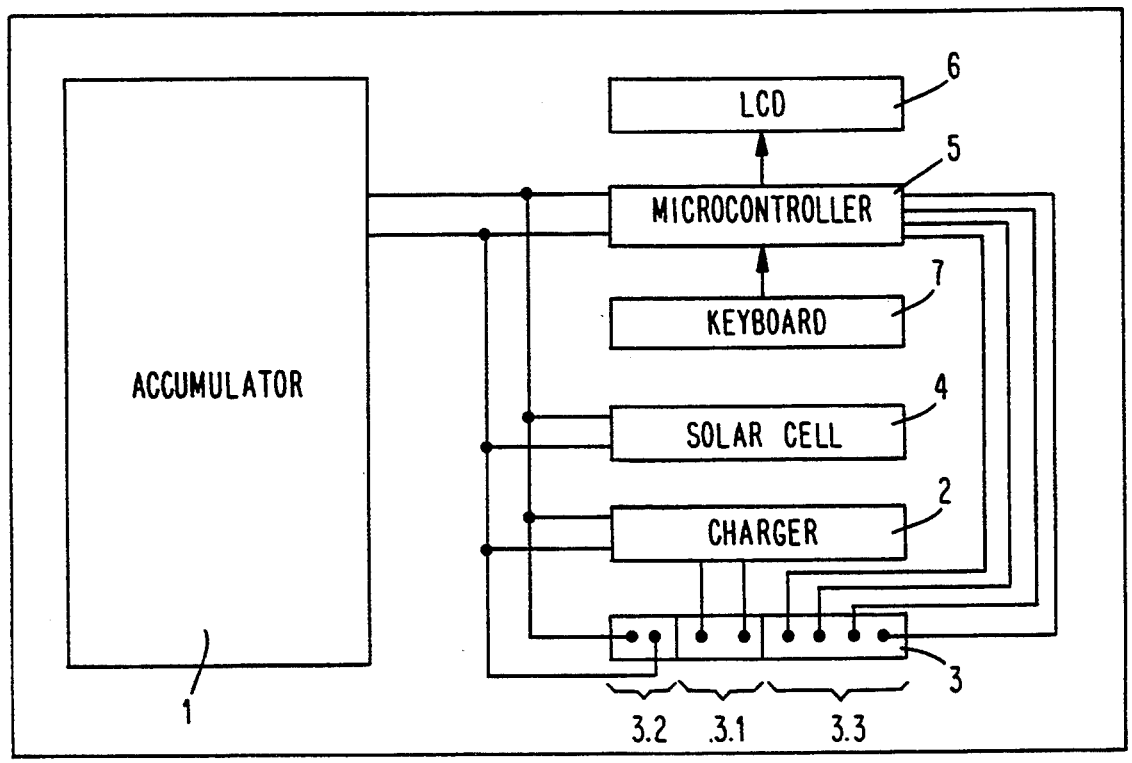
FIG. 1 illustrates various elements incorporated in a self-contained component according to the invention.

An accumulator supply source according to the invention comprises for its charging and its testing a set of elements of the type of the one shown in FIG. 1. In this figure are shown an accumulator set 1, a charging circuit 2, a connector 3 having charging terminals 3.1, utilization terminals 3.2 and data exchange terminals 3.3., a solar cell 4, being another charging means, a microcontroller 5 associated with display circuits 6 for providing various informations on the state of accmulators 1, and an optional keyboard 7 for data input.

As indicated above, those elements usually exist in the form of various components connected at various positions of a system, possibly on the same printed circuit board.

The object of the present invention is, on the one hand, to assemble those elements in the form of a single portable object having a credit card format, on the other hand to provide for specific modes of testing and displaying the state of accumulator 1 while using common means for the implementation of the various tests, whereby the system is simplified and less cumbersome.

In this purpose, the invention uses, as an energy source, an accumulator having a negligeable autodischarge formed from sheets or layers.

A non-limitative example of such an accumulator is shown in FIGS. 2.1 and 2.2. It comprises, on a metallic anode 11, which is a current collector, a set 12 comprising a composite anode layer 13, mainly comprised of lithium, a polymer electrolyte 14 and a cathode 15 made of a plastic composite material.

Conventionally, each of the layers 11, 13, 14 and 15 has a thickness in the range of 50 μm. Accordingly, the whole thickness of a cell, such as the one of FIG. 2.2 may be of about 0,2 mm.

The invention uses such a layer set on substantially all the available surface of a structure of the credit card type, conventionally having lateral dimensions of 85×54 mm, that is about 40 cm². With such a cell, one obtains a rated energy of one milliampere-hour per cm² (mAh/cm²) a rated voltage of 3 volts. This cell has the advantage of bearing about 1000 cycles of charge after a deep discharge instead of only 500 cycles for nickel-cadmium accumulators. Additionally, the discharge ratio is lower than 0,01% per year at 25° C. instead of 25% per month for the nickel-cadmium. Furthermore, this device may operate in a temperature range −20° to +150° C.

So, in a rectangular film of 8×5 cm, having a thickness of 0,2 mm, one obtains a voltage of 3 volts and a rated energy of 40 mAh. For obtaining a 6 volt voltage, a block associating two elementary serially connected cells is formed. Five parallel blocks provide a voltage of 6 volts with a rated energy of 200 mAh.

Accordingly, the invention provides an accumulator having a credit card format with a planar electrode structure of the type shown in FIGS. 2.1 and 2.2.

An example of such an arrangement is illustrated in FIG. 3. The accumulator plates 11 and 12 of FIG. 2 are shown, plate 11 overhanging with respect to plate 12 for forming an anode contact on its upper surface. It is clear that a cell pile can also be used. The layers are formed or assembled on a carrier 20 made of a plastic film forming the lower surface of the cell, this film having apertures wherein solar cells 28 are placed.

A first printed circuit board 21 is used in particular for establishing a contact with anode 11. A second printed circuit board 22 and a third printed circuit board 23 are also shown.

In the Figure, the printed circuit board 22 comprises apertures 24–26. In those apertures are arranged integrated circuits or other electronic components, for example, an integrated circuit comprising all the elements necessary for charging the accumulator from the mains, of the microcontroller 5 of FIG. 1, etc. The surfaces of the printed circuit 22 comprise means for connecting the various elements and the accumulator electrodes 11, 12.

In a first aperture of the printed circuit board 23 are arranged an electrode area 33 for charging, utilization, and data exchange and, in various apertures 29–32 ( refer to FIG. 4), display devices. The device is covered with a transparent plastic film 35 through which expose the connector electrodes 33. In aperture 29 appear two control lights, for the solar cell and the charge circuit. Through apertures 30–32 appear, for example liquid crystal displays, respectively for the charge ratio, the instantaneous consumption, and the residual lifetime, as explained in detail hereinafter.

Indeed, an aspect of the invention is to provide for the display of state information for providing a self-contained and reliable accumulator permanently providing indications on its own state.

Generally, a voltage measurement across an accumulator provides an inaccurate measurement of the charging state of this accumulator. This is due to the fact that the discharge/charge curve is not linear in the useful voltage range and, additionally, depends upon the load connected to the accumulator.

According to the invention, the above mentioned microcontroller is used for taking measurements of the current $I_i$ flowing through the accumulator at times $t_i$ separated by regular time intervals $\Delta t$. $\Delta t$ is chosen small enough for considering that the current is constant during a time interval $\Delta t$. Thus, the charge variation $\Delta Q_i$ in the accumulator is:

$$\Delta Q_i = I_i \Delta t,$$

I being negative in case of discharge and positive in case of charge. Knowing the maximum charge $Q_{max}$ of the accumulator, which is data characteristic thereof, those charge variations are summed in a register:

$$\sum_i \Delta Q_i = \sum_i \Delta t I_i$$

At every time, the charge state $\eta$ is calculated:

$$\eta = 100[1 + \Sigma \Delta Q_i / Q_{max}], \text{ in \%.}$$

When the accumulator attains a deep discharge, one has:

$$\Sigma \Delta Q_i = -Q_{max}$$
$$\eta = 0\%$$

When the accumulator is fully charged, one has:

$$\Sigma \Delta Q_i = 0$$
$$\eta = 100\%,$$

and the register is reset.

This simple operation is easily carried out by a microcontroller provided with calculation, storing, analogic input-output, and display control means. Additionally, when the measured charge state gets lower than a predetermined threshold, the controller inhibits the output on the utilization circuit for avoiding an excessive discharge of the controller, which could impair the accumulator, and for maintaining the operation of microcontroller and its associated memories.

Measurement of the instantaneous consumption is made in a similar way by measuring at each time interval $\Delta t$ the value of the voltage across the accumulator and by calculating the difference $\Delta V$ with respect to the voltage measured during the former time interval. The value $\Delta V/\Delta t$ indicates the accumulator flow or instantaneous consumption.

According to an aspect of the invention, the residual lifetime of the accumulator is also calculated. Indeed, an accumulator can be submitted to a determined number of charge and discharge cycles. It has a lifetime of N full cycles and a capacity equal to $N \times Q_{max}$. However, in practice, the measurement is more complex due to the fact that it happens that the accumulator is charged while it is not yet fully discharged. Therefore, one uses the above mentioned measurement of the charge variation ($\Delta Q = I\Delta t$) for measuring the charge rate. The total charge provided by the accumulator since its first charge is stored in a register, $Q^{31} = \Sigma \Delta Q^{31}$, with $\Delta Q^{31} = I\Delta t$, only during the discharge periods. The residual lifetime is accordingly expressed by:

$$1 - Q^- / NQ_{max}.$$

The display in the above mentioned aperture 32 can be used for providing an indication on the residual lifetime of the accumulator.

The card according to the invention comprises a connector as conventionally used with credit cards (connector 33 of FIGS. 3 and 4.1) and will be easily adapted to devices having slots for receiving conventional credit cards.

The invention is liable of many variants and modifications which will appear to those skilled in the art, as regards the selection and the arrangement of the various elements.

A coding keyboard 34 (FIGS. 3 and 4.1) provides a controlled access to the source comprised on the card or to an external source.

In particular, those skilled in the art will be able to choose and program a microcontroller having memory and display control means for satisfying the above mentioned functions, for example, the microcontroller μpD75328 GC of Nippon Electric Corp.

Additionally, the arrangement disclosed in connection with FIG. 3 constitutes only an exemplary embodiment of the invention. Those skilled in the art will be able to provide means other than a pile of three printed circuit boards for associating, according to a credit card format, various charge and measurement elements with an accumulator comprising a pile of sheets or planar layers.

Additionally, the self-contained accumulator and test component according to the invention has been above disclosed in connection with an auto-test use, that is the test elements are used for testing the accumulator of the component itself.

This self-contained component, associated with the above mentioned coding keyboard can also be used as a complement of a main energy source, for:
  setting it,
  checking its charge, instantaneous consumption and lifetime parameters,
  protecting it against any fraudulent use,
  memorizing its operation state,
  resetting it...

This type of application appears in particular in electrical vehicles wherein the component according to the invention can be used as a gauge for the main batteries of the vehicle and as an electronic contact key.

We claim:

1. A self-contained portable electronic power supply component having a credit card format comprising:
   at least an accumulator made of a pile of sheets or planar layers the surface of which is substantially equal to the surface of a credit card,
   at least a charge circuit,
   output supply terminals,
   a microcontroller associated with means for measuring at short and regular time intervals $\Delta t$ a positive or negative current I in the accumulator and means for calculating, storing and summing charge variations ($\Delta Q = I\Delta t$),
   an indicator of a residual number of possible recharge, using the result (Q) of the sum of the charge variations during discharge phases and displaying the result of the relation $1 - Q/NQ_{max}$,
   a charge ratio indicator using the result ($\Sigma \Delta Q_i$) of the summation of the charge variation during the charge and discharge phases and displaying the result of a relation characterized by $\eta = 100[1 + \Sigma \Delta Q_i / Q_{max}]$, in %,
   where $Q_{max}$ designates a predetermined value of a maximum charge of the accumulator and N designates a predetermined value of its maximum number of full recharge,
   above the pile of sheets forming the accumulator, at least one printed circuit board, one of said at least one board being provided with apertures, wherein within said apertures of said one board are placed at least one electronic circuit element necessary to the operation of the component, an upper board being provided with apertures, wherein within said apertures of said upper board are placed state indicators apparent from the outside.

2. A component according to claim 1, comprising means for connecting the state indicators to an external accumulator, for testing the latter.

3. A self-contained portable electronic power supply component having a credit card format comprising:
   at least an accumulator made of a pile of sheets or planar layers, the surface of which is substantially equal to the surface of a credit card,
   at least a charge circuit,
   output supply terminals,
   a microcontroller associated with means for measuring at short and regular time intervals $\Delta t$ a positive or negative current I in the accumulator and means for calculating, storing and summing charge variations ($\Delta Q = I\Delta t$),
   an indicator of a residual number of possible recharge, using the result (Q) of the sum of the charge variations during discharge phases and displaying the result of the relation $1 - Q/NQ_{max}$,
   a charge ratio indicator using the result ($\Sigma \Delta Q_i$) of the summation of the charge variation during the charge and discharge phases and displaying the result of a relation characterized by $\eta = 100[1 + \Sigma \Delta Q_i / Q_{max}]$, in %,
   where $Q_{max}$ designates a predetermined value of a maximum charge of the accumulator and N designates a predetermined value of its maximum number of full recharge,
   means for inhibiting an output of the accumulator when its charging state is lower than a predetermined threshold.

4. A self-contained portable electronic power supply component having a credit card format comprising:
   at least an accumulator made of a pile of sheets or planar layers, the surface of which is substantially equal to the surface of a credit card,
   at least a charge circuit, and
   output supply terminals,
   wherein one of said sheets or layers is an anode,
   a first printed circuit board disposed adjacent a side surface of said accumulator and establishing a contact with said anode.

* * * * *